(12) United States Patent
Oba et al.

(10) Patent No.: US 6,715,523 B2
(45) Date of Patent: Apr. 6, 2004

(54) MULTI-PIECE RIM

(75) Inventors: Kentaro Oba, Ayase (JP); Satoru Miyashita, Ebina (JP); Ichiro Takeuchi, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/286,811

(22) Filed: Nov. 4, 2002

(65) Prior Publication Data

US 2003/0140998 A1 Jul. 31, 2003

(30) Foreign Application Priority Data

Jan. 28, 2002 (JP) ........................................ 2002-018969

(51) Int. Cl.[7] .............................................. B60B 25/04
(52) U.S. Cl. ...................................... 152/410; 152/409
(58) Field of Search ................................ 152/406, 409, 152/410, DIG. 10

(56) References Cited

U.S. PATENT DOCUMENTS

| | | | | |
|---|---|---|---|---|
| 1,961,095 A | * | 5/1934 | Baker et al. ................. 152/405 |
| 2,038,212 A | * | 4/1936 | Frank .......................... 301/6.2 |
| 2,478,580 A | * | 8/1949 | Hollerith ..................... 152/406 |
| 2,802,508 A | * | 8/1957 | Brink .......................... 152/410 |
| 3,327,754 A | * | 6/1967 | Travers ........................ 152/410 |
| 5,335,706 A | * | 8/1994 | Foster ......................... 152/410 |

FOREIGN PATENT DOCUMENTS

JP    58-122203    7/1983

* cited by examiner

Primary Examiner—Russell D. Stormer
(74) Attorney, Agent, or Firm—Pillsbury Winthrop LLP

(57) ABSTRACT

A multi-piece rim includes a rim base including a first flange and a gutter band, a bead seat band including a second flange, a lock ring, and a first side ring located on a side of the first flange and a second side ring located on a side of the second flange. A circumferentially extending surface of the first flange and a tapered surface of a circumferentially extending inner surface of the first side ring and/or a circumferentially extending surface of the second flange and a tapered surface of a circumferentially extending inner surface of the second side ring are inclined radially outwardly in an axially outboard direction of the multi-piece rim, so that circumferential and radial slippage between rim members is prevented to suppress a fretting fatigue.

5 Claims, 4 Drawing Sheets

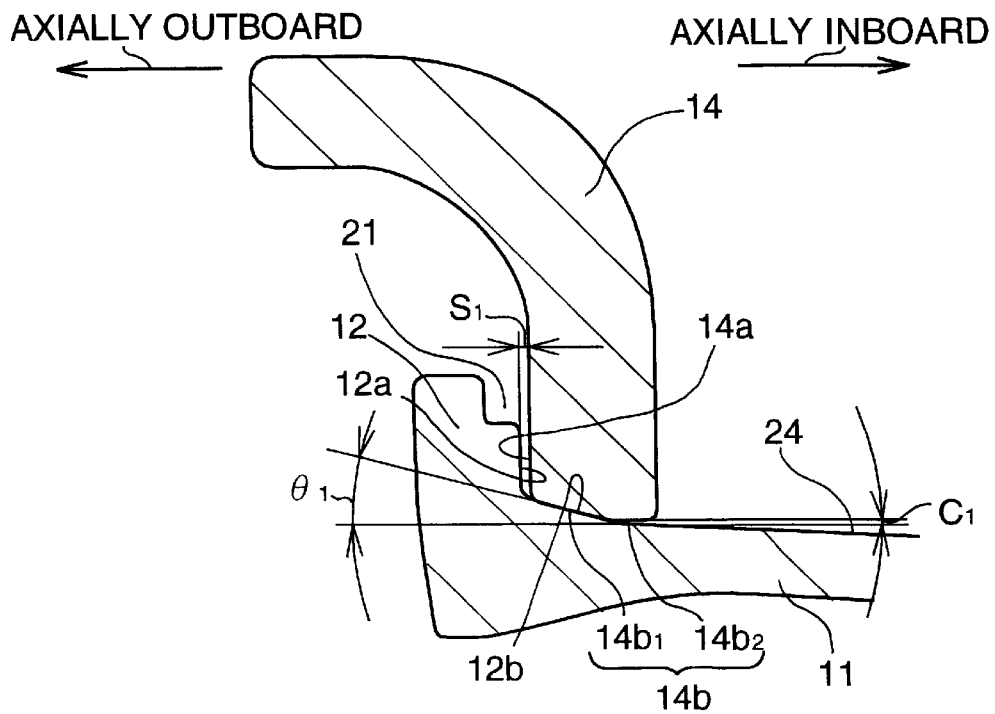
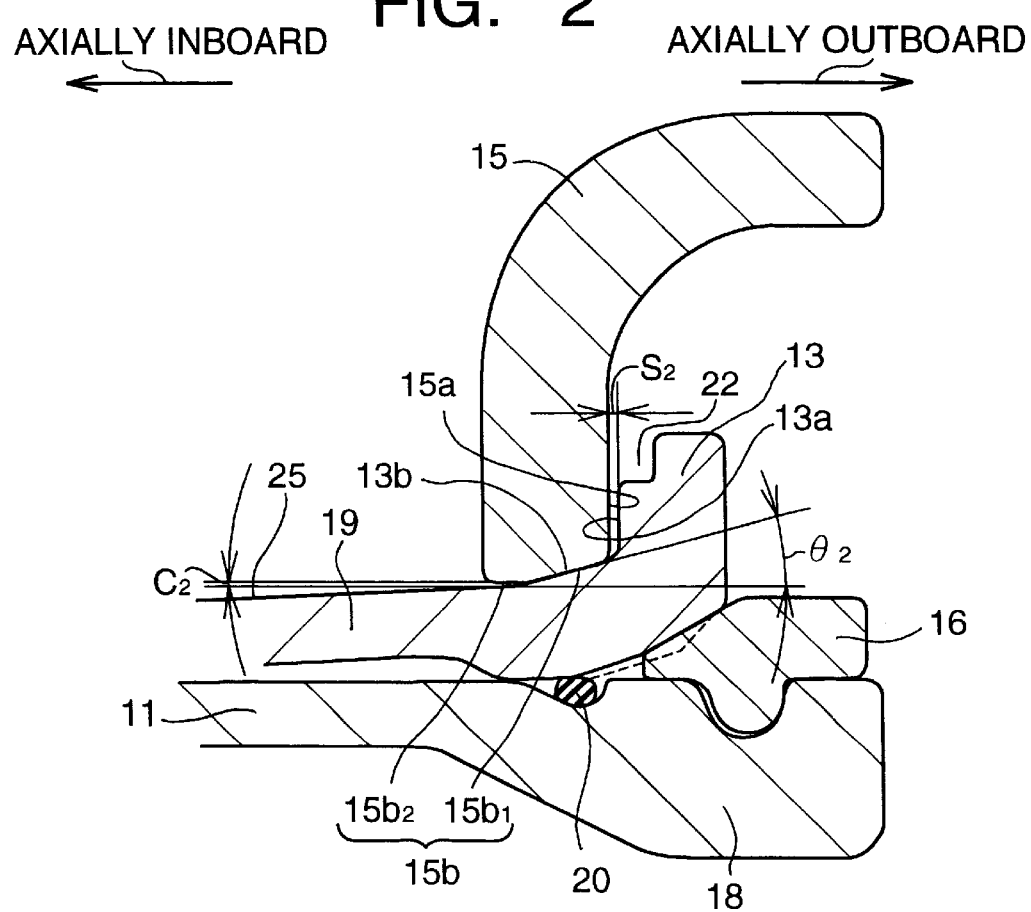

MULTI-PIECE RIM

This application is based on and claims priority from Japanese Patent Application No. 2002-18969 filed on Jan. 28, 2002, the content of which is incorporated herein by reference.

BACKGROUND OF THE INVENTION

1. Field of the Invention

The present invention relates to a multi-piece rim used for wheels mounted on construction vehicles and the like.

2. Description of the Related Art

In a wheel of a large-sized construction vehicle, since a tire has a high rigidity, a multi-piece rim is usually used for mounting the tire so as to facilitate mounting and demounting of the tire.

FIGS. 6–8 illustrate a structure of a conventional multi-piece rim. As illustrated in FIG. 8, the conventional multi-piece rim includes (1) an annular rim base 1 which includes a first, back flange 2 and a gutter band 8, (2) a bead seat band 9 which is mounted radially outside the gutter band 8 and includes a second flange 3, (3) a lock ring 6 which has one slit in a circumferential direction and prevents the bead seat band 9 from moving axially outwardly from gutter band 8, and (4) first and second side rings 4 and 5 which are axially supported by the first flange 2 and the bead seat band 9, respectively, although slightly movable in an axial direction of the multi-piece rim. A tire 7 is mounted axially inboard of the side rings 4 and 5.

As illustrated in FIGS. 6 and 7, a contact surface of the first flange 2 with the first side ring 4 and a contact surface of the second flange 3 with second the side ring 5, respectively, extend in a direction perpendicular to the axial direction of the multi-piece rim. In order to facilitate mounting of the side rings 4 and 5, a radial clearance C is provided radially between the first side ring 4 and rim base 1, and a radial clearance C' is provided radially between the second side ring 5 and the bead seat band 9.

In the conventional multi-piece rim, due to the radial clearances C, C' provided radially inside the first and second side rings 4 and 5, and a rigidity difference between rim members, a small amount of mutual slippage is likely to occur between the rim members during running of the vehicle.

Especially in the case of a demountable rim which is directly coupled to a hub by a clamp, the mutual slippage in the radial direction and in the circumferential direction may repeatedly occur between the first side ring 4 and the rim base 1 and between the second side ring 5 and the bead seat band 9. This may cause the following problems:

(1) A bead portion of the tire may be damaged.
(2) A coated layer coated on a bead seat portion of the rim may be peeled off to cause a corrosion fatigue.
(3) Contact surfaces of the rim members may be damaged due to a fretting fatigue.
(4) Small cracks may be generated due to friction between the rim members.
(5) An O-ring may be damaged to cause air leakage.

As a result, the durability of the conventional multi-rim may be decreased.

In order to solve the above-described problems, the applicant previously proposed a multi-piece rim structure in Japanese Patent Examined Publication No. H4-4161. According to the proposed structure, the mutual slippage problem as described above can be solved, but the following problems still exist:

(a) First and second inclined surfaces must be formed in first and second side rings, respectively, resulting in an increase in cost.
(b) A relatively large amount of axial clearance needs to be provided between a side ring and a back flange. As a result, when the side ring is broken due to an axial force exerted on the rim, the side ring will collide with the back flange with a relatively high speed, accelerated due to the relatively large amount of the axial clearance, which may damage the back flange.

SUMMARY OF THE INVENTION

An object of the present invention is to provide a multi-piece rim which is durable and reliable, and can also reduce a mutual slippage between a first side ring and a first flange and/or between a second side ring and a second flange thereby suppressing a fretting fatigue.

The above-described object can be achieved by the present invention, as follows:

A multi-piece rim includes (a) a rim base which includes a first flange having a first stepped recess for inserting a tool therein and a gutter band, (b) a bead seat band which includes a second flange having a second stepped recess for inserting a tool therein, (c) a lock ring, and (d) a first side ring located on a side of the first flange and a second side ring located on a side of the second flange.

The first side ring includes a radially extending, axially outboard side surface, and a circumferentially extending inner surface which includes a tapered surface and a non-tapered surface located axially inboard of the tapered surface.

The second side ring includes a radially extending, axially outboard side surface, and a circumferentially extending inner surface which includes a tapered surface and a non-tapered surface located axially inboard of the tapered surface.

The first flange of the rim base includes a radially extending, axially inboard surface, axially opposing the radially extending side surface of the first side ring, and a circumferentially extending surface radially contacting the tapered surface of the circumferentially extending inner surface of the first side ring. The second flange of the bead seat band includes a radially extending, axially inboard surface, axially opposing the radially extending side surface of the second side ring, and a circumferentially extending surface radially contacting the tapered surface of the circumferentially extending inner surface of the second side ring.

The circumferentially extending surface of the first flange and the tapered surface of the circumferentially extending inner surface of the first side ring are inclined radially outwardly in an axially outboard direction of the multi-piece rim.

An axial clearance is provided between the radially extending surface of the first flange and the radially extending side surface of the first side ring. The axial clearance has a magnitude equal to or less than about 15 mm, and more preferably, a magnitude of about 2 to about 4 mm.

The radially extending surface of the first flange and the radially extending side surface of the first side ring may contact each other.

The circumferentially extending surface of the first flange and the tapered surface of the circumferentially extending inner surface of the first side ring are inclined by about 10 to about 35 degrees with respect to an axial direction of the multi-piece rim.

The circumferentially extending surface of the second flange and the tapered surface of the circumferentially extending inner surface of the second side ring are inclined radially outwardly in an axially outboard direction of the multi-piece rim.

A second axial clearance is provided between the radially extending surface of the second flange and the radially extending side surface of the second side ring. The second axial clearance has a magnitude equal to or less than about 15 mm, and more preferably, a magnitude of about 2 to about 4 mm.

The radially extending surface of the second flange and the radially extending side surface of the second side ring may contact each other.

The circumferentially extending surface of the second flange and the tapered surface of the circumferentially extending inner surface of the second side ring are inclined by about 10 to about 35 degrees with respect to the axial direction of the multi-piece rim.

In the multi-piece rim according to the present invention, since the circumferentially extending surface of the first flange and the tapered surface of the circumferentially extending inner surface of the first side ring and/or the circumferentially extending surface of the second flange and the tapered surface of the circumferentially extending inner surface of the second side ring are inclined radially outwardly in the axially outboard direction of the multi-piece rim, frictional forces generated between rim members when a tire pressure acts on the side rings are increased to suppress a circumferential slippage between the rim members. As a result, a fretting fatigue due to the mutual slippage between the rim members is effectively suppressed.

Further, since the axial clearance of the magnitude equal to or less than about 15 mm, more preferably, the magnitude of about 2 to about 4 mm is provided between the radially extending surface of the first flange and the radially extending side surface of the first side ring and/or between the radially extending surface of the second flange and the radially extending side surface of the second side ring, even if the side rings are broken, the side rings will collide with the flanges and stop before a moving speed of the side rings is accelerated. Thus, the flanges will not be broken and the side rings will be prevented from moving axially outwardly from the multi-piece rim.

In the case where the radially extending surface of the first flange and the radially extending side surface of the first side ring and/or the radially extending surface of the second flange and the radially extending side surface of the second side ring contact each other, even if the side rings are broken, the side rings will not move axially outboard. Thus, the flanges will not be broken. Further, due to the frictional force between the contact surfaces, a circumferential slippage between the rim members will be effectively suppressed.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 1 is an enlarged cross-sectional view of a side ring and its vicinity located at a first axial end of a multi-piece rim according to a first embodiment of the present invention;

FIG. 2 is an enlarged cross-sectional view of a side ring and its vicinity located at a second, opposite axial end of the multi-piece rim of FIG. 1;

DETAILED DESCRIPTION OF THE PREFERRED EMBODIMENTS

Figure 3:
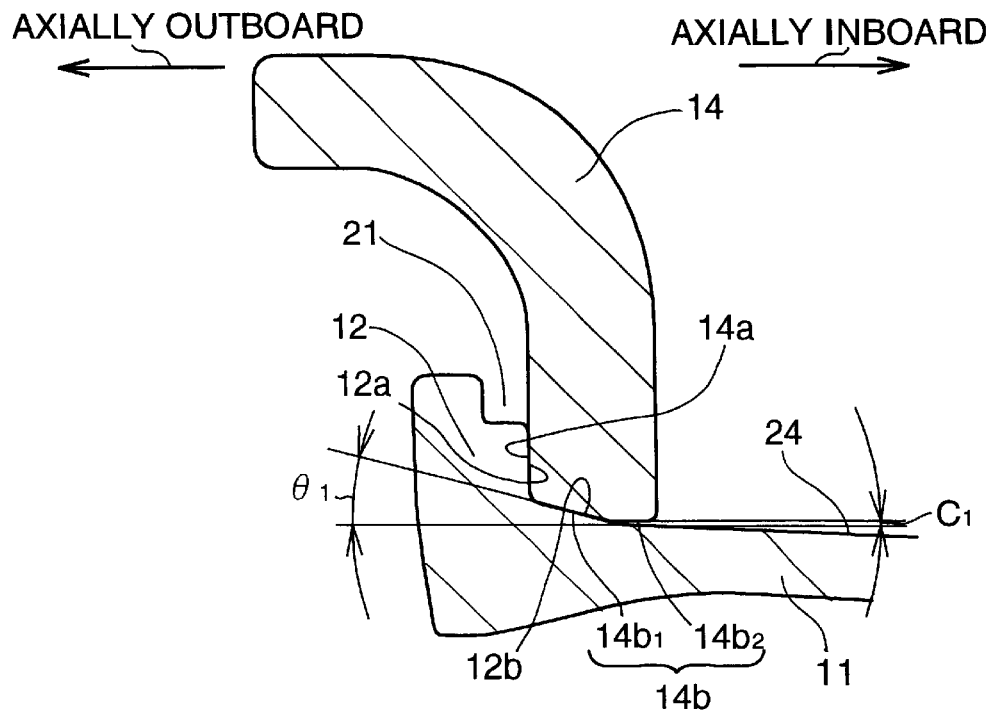
FIG. 3 is an enlarged cross-sectional view of a side ring and its vicinity located at a first axial end of a multi-piece rim according to a second embodiment of the present invention.
Figure 4:
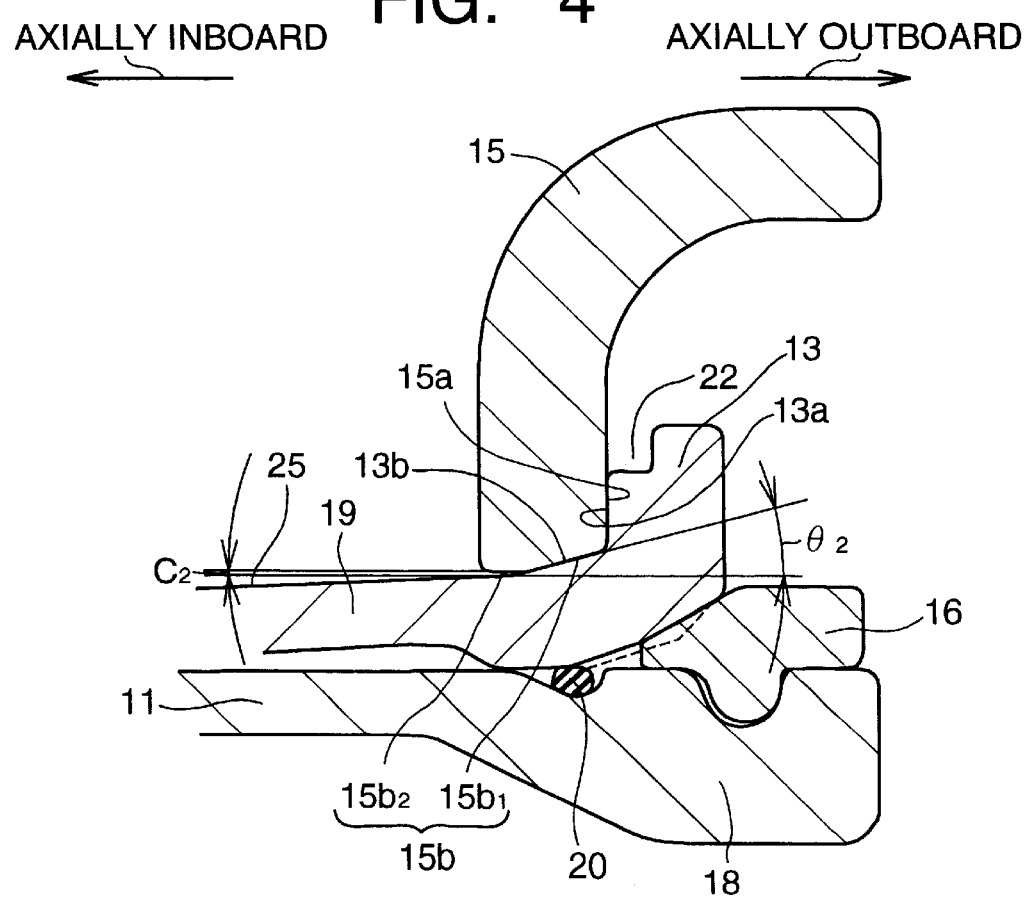
FIG. 4 is an enlarged cross-sectional view of a side ring and its vicinity located at a second, opposite axial end of the multi-piece rim of FIG. 3.
Figure 5:
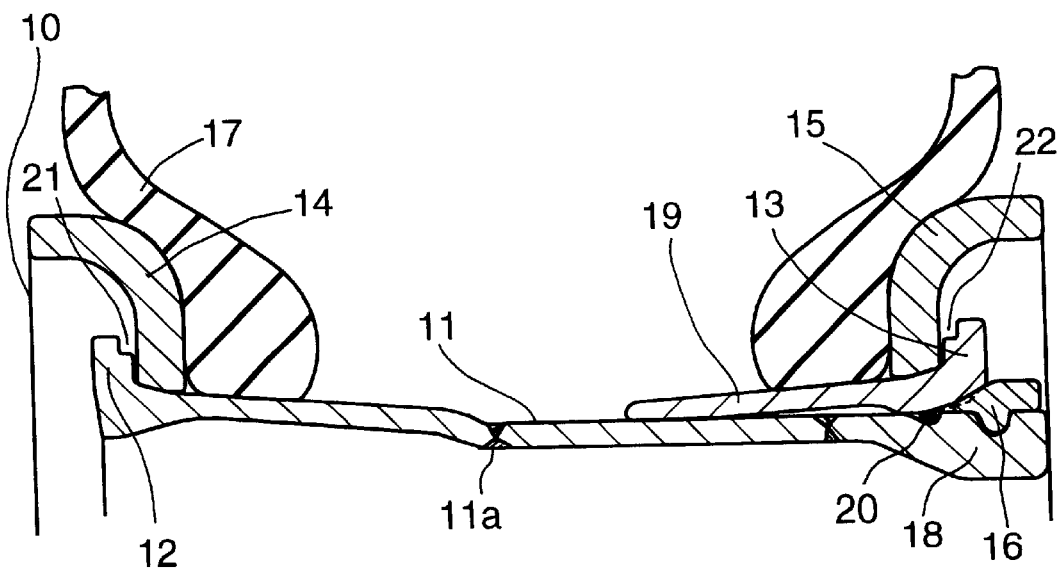
FIG. 5 is a cross-sectional view of an entire portion of the multi-piece rim of FIG. 1.
Figure 6:
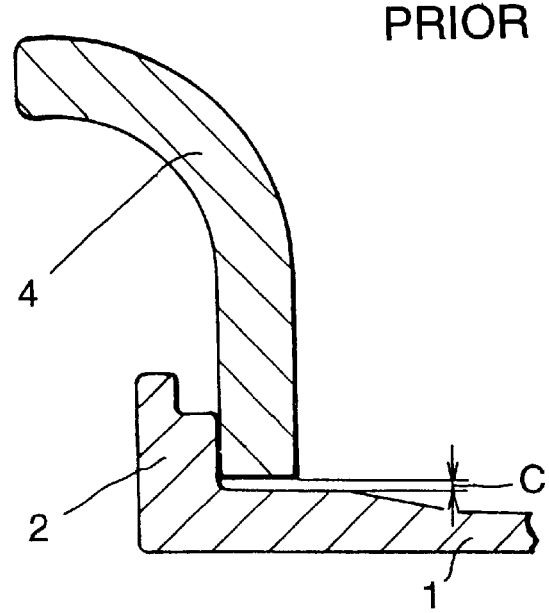
FIG. 6 is an enlarged cross-sectional view of a side ring and its vicinity located at a first axial end of a conventional multi-piece rim.
Figure 7:
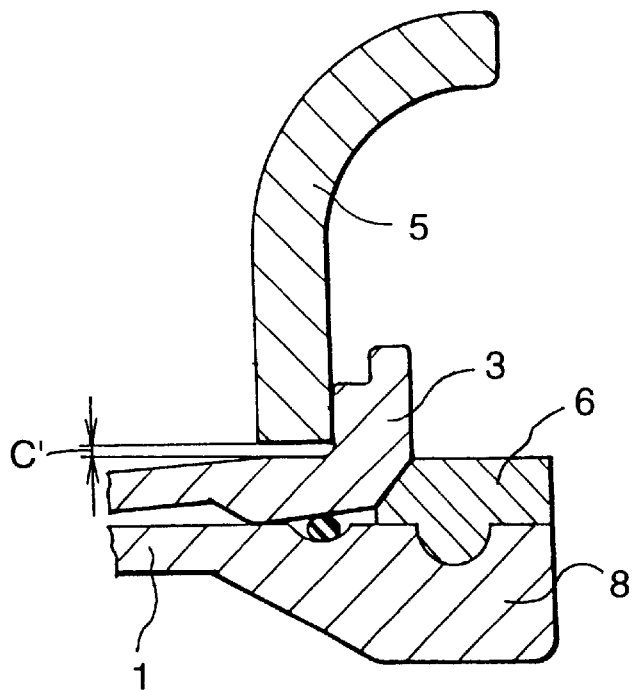
FIG. 7 is an enlarged cross-sectional view of a side ring and its vicinity located at a second, opposite end of the conventional multi-piece rim of FIG. 6.
Figure 8:
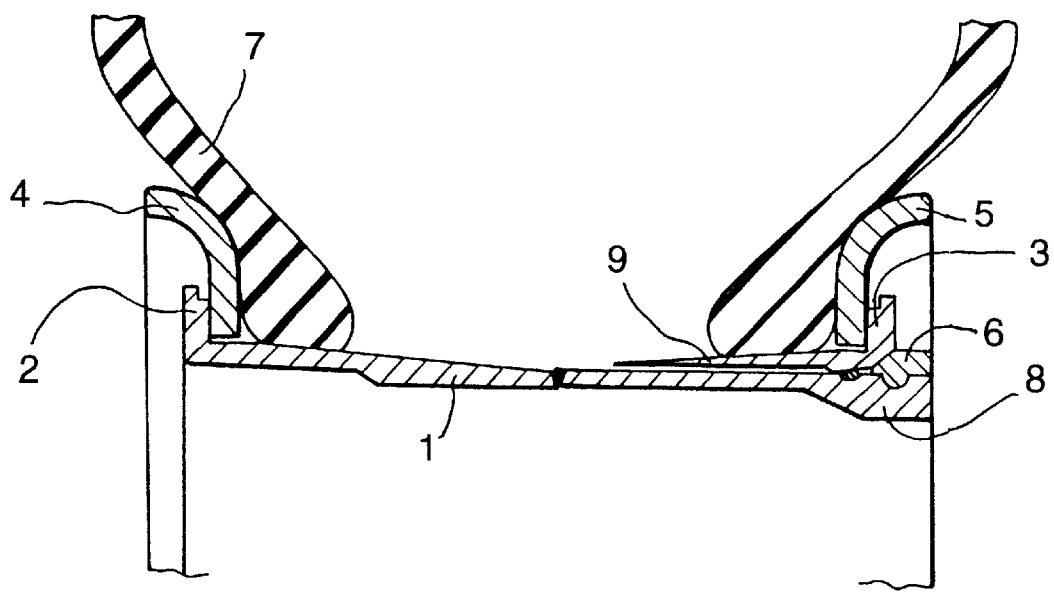
FIG. 8 is a cross-sectional view of an entire portion of the conventional multi-rim of FIG. 6.

FIGS. 1, 2 and 5 illustrate a multi-piece rim 10 according to a first embodiment of the present invention. FIGS. 3 and 4 illustrate a multi-piece rim 10 according to a second embodiment of the present invention. Similar structural portions are denoted with the same reference numerals in the first and second embodiments.

As illustrated in FIGS. 1–5, the multi-piece rim 10 includes (a) a rim base 11 which includes a first, back flange 12 and a gutter band 18, (b) a bead seat band 19 which includes a second flange 13, (c) a lock ring 16, (d) a first side ring 14 located on a side of the first flange 12 and a second side ring 15 located on a side of the second flange 13. The first flange 12 includes a first stepped recess 21 for inserting a tool therein. The second flange 13 includes a second stepped recess 22 for inserting a tool therein.

The first side ring 14 includes a radially extending, axially outboard side surface 14$a$, and a circumferentially extending inner surface 14$b$. The circumferentially extending inner surface 14$b$ includes a tapered surface 14$b_1$ and a non-tapered surface 14$b_2$ located axially inboard of the tapered surface 14$b_1$.

The second side ring 15 includes a radially extending, axially outboard side surface 15$a$, and a circumferentially extending inner surface 15$b$. The circumferentially extending inner surface 15$b$ includes a tapered surface 15$b_1$ and a non-tapered surface 15$b_2$ located axially inboard of the tapered surface 15$b_1$.

The first flange 12 of the rim base 11 includes a radially extending, axially inboard surface 12$a$ axially opposing the radially extending side surface 14$a$ of the first side ring 14, and a circumferentially extending surface 12$b$. The radially extending surface 12$a$ of the first flange 12 does not include a surface of the first stepped recess 21. The circumferentially extending surface 12$b$ of the first flange 12 radially contacts the tapered surface 14$b_1$ of the circumferentially extending inner surface 14$b$ of the first side ring 14.

The second flange 13 of the bead seat band 19 includes a radially extending, axially inboard surface 13$a$ axially opposing the radially extending side surface 15$a$ of the second side ring 15, and a circumferentially extending surface 13$b$. The radially extending surface 13$a$ of the second flange 13 does not include a surface of the second stepped recess 22. The circumferentially extending surface 13b of the second flange 13 radially contacts the tapered surface 15b₁ of the circumferentially extending inner surface 15b of the second side ring 15.

The rim base 11 may be formed integral or may be formed in separate pieces which are then welded at a central portion 11a to a single rim base. An O-ring 20 is disposed between the bead seat band 19 and the gutter band 18 to seal an interior of a tire 17. The lock ring 16 has one slit in a circumferential direction. After axially mounting the first side ring 14 and the tire 17 onto the rim base 11 and axially mounting the second side ring 15 and the bead seat band 19 radially outside the gutter band 18, the lock ring 16 is fitted into a groove of the gutter band 18. The lock ring 16 prevents the bead seat band 19 from moving axially outwardly from the multi-piece rim 10 when a force from the tire 17 acts on the bead seat band 19 via the second side ring 15.

In order to facilitate mounting of the first side ring 14, a radial clearance $C_1$ is provided between the non-tapered surface 14b₂ of the first side ring 14 and an outside surface of a first bead seat portion 24 axially connected to the circumferentially extending surface 12b of the first flange 12. Similarly, in order to facilitate mounting of the second side ring 15, a radial clearance $C_2$ is provided between the non-tapered surface 15b₂ of the second side ring 15 and an outside surface of a second bead seat portion 25 which is formed in the bead seat band 19 and is connected to the circumferentially extending surface 13b of the second flange 13.

Referring to FIGS. 1 and 3, the circumferentially extending surface 12b of the first flange 12 and the tapered surface 14b₁ of the circumferentially extending inner surface 14b of the first side ring 14 are inclined radially outwardly in an axially outboard direction of the multi-piece rim 10 by an angle $\theta_1$ with respect to the axially direction of the multi-piece rim 10. The angle $\theta_1$ is preferably in the range of about 10 to about 35 degrees. The numerical basis for the range of about 10 to about 35 degrees of the angle $\theta_1$ is as follows: If the angle $\theta_1$ is less than about 10 degrees, a mutual slippage prevention effect over the conventional multi-piece rim will not be obtained. When the angle $\theta_1$ exceeds about 35 degrees, a sufficient rigidity of the first side ring 14 will not be maintained due to a rigidity difference between first flange 12 and the first side ring 14.

As illustrated in FIG. 1, an axial clearance $S_1$ may be provided between the radially extending surface 12a of the first flange 12 and the radially extending side surface 14a of the first side ring 14. Preferably, the axial clearance $S_1$ has a magnitude equal to or less than about 15 mm, and more preferably, a magnitude of about 2 to about 4 mm. The numerical basis for the magnitude equal to or less than about 15 mm and the magnitude of about 2 to about 4 mm of the axial clearance $S_1$ is as follows: If the magnitude is less than about 2 mm, when assembled, the first side ring 14 may interfere with the first flange 12. If the magnitude exceeds about 15 mm, when the first side ring 14 is broken, the side ring 14 will collide with the first flange 12 at a relatively high speed to damage the first flange 12. If the magnitude is equal to or less than 4 mm, the collision speed will be lower.

As illustrated in FIG. 3, the radially extending surface 12a of the first flange 12 and the radially extending side surface 14a of the first side ring 14 may contact each other.

Similarly, referring to FIGS. 2 and 4, the circumferentially extending surface 13b of the second flange 13 and the tapered surface 15b₁ of the circumferentially extending inner surface 15b of the second side ring 15 are inclined radially outwardly in an axially outboard direction of the multi-piece rim 10 by an angle $\theta_2$ with respect to the axial direction of the multi-piece rim 10. The angle $\theta_2$ is preferably in the range of about 10 to about 35 degrees. The numerical basis for the range of about 10 to about 35 degrees of the angle $\theta_2$ is the same as that of the angle $\theta_1$ as discussed above.

As illustrated in FIG. 2, an axial clearance $S_2$ may be provided between the radially extending surface 13a of the second flange 13 and the radially extending side surface 15a of the second side ring 15. Preferably, the axial clearance $S_2$ has a magnitude equal to or less than about 15 mm, and more preferably, a magnitude of about 2 to about 4 mm. The numerical basis for the magnitude equal to or less than about 15 mm and the magnitude of about 2 to about 4 mm of the axial clearance $S_2$ is the same as that of the axial clearance $S_1$ as discussed above.

As illustrated in FIG. 4, the radially extending surface 13a of the second flange 13 and the radially extending side surface 15a of the second side ring 15 may contact each other.

The multi-piece rim according to the present invention presents the following technical advantages:

First, since the circumferentially extending surface 12b of the first flange 12 and the tapered surface 14b₁ of the circumferentially extending inner surface 14b of the first side ring 14 are inclined radially outwardly in the axially outboard direction of the multi-piece rim 10, when a force from the tire acts on the first side ring 14, the frictional force between the first flange 12 and the first side ring 14 is increased due to a wedge effect. As a result, a slippage in the circumferential direction between the first flange 12 and the first side ring 14 is prevented, so that cracks due to fretting are prevented from being generated at the contact portions of the first flange 12 and the first side ring 14.

Second, in the case where the axial clearance $S_1$ of the magnitude equal to or less than about 15 mm, more preferably, the magnitude of about 2 to about 4 mm is provided between the radially extending surface 12a of the first flange 12 and the radially extending side surface 14a of the first side ring 14, even if the first side ring 14 is broken, the first side ring is prevented from colliding with the first flange 12 at a high speed, thereby preventing the first flange 12 from being broken.

Third, in the case where the radially extending surface 12a of the first flange 12 and the radially extending side surface 14a of the first side ring 14 contact each other, due to the frictional force between the surface 12a and the surface 14a, the mutual slippage in the circumferential direction between the first flange 12 and the first side ring 14 will be prevented more effectively.

Fourth, in the case where the circumferentially extending surface 12b of the first flange 12 and the tapered surface 14b₁ of the circumferentially extending inner surface 14b of the first side ring 14 are inclined by about 10 to about 35 degrees with respect to the axial direction of the multi-piece rim 10, the mutual slippage in the circumferential direction is prevented more effectively, so that generation of cracks due to fretting is prevented more effectively.

Fifth, since the circumferentially extending surface 13b of the second flange 13 and the tapered surface 15b₁ of the circumferentially extending inner surface 15b of the second side ring 15 are inclined radially outwardly in the axially outboard direction of the multi-piece rim 10, when a force from the tire acts on the second side ring 15, the frictional force between the second flange 13 and the second side ring 15 is increased due to a wedge effect. As a result, a slippage in the circumferential direction between the second flange 13 and the second side ring 15 is prevented, so that cracks due to fretting are prevented from being generated at the contact portions of the second flange 13 and the second side ring 15.

Sixth, in the case where the axial clearance $S_2$ of the magnitude equal to or less than about 15 mm, more preferably, the magnitude of about 2 to about 4 mm is provided between the radially extending surface 13a of the second flange 13 and the radially extending side surface 15a of the second side ring 15, even if the second side ring 15 is broken, the second side ring is prevented from colliding with the second flange 13 at a high speed, thereby preventing the second flange 13 from being broken.

Seventh, in the case where the radially extending surface 13a of the second flange 13 and the radially extending side surface 15a of the second side ring 15 contact each other, due to the frictional force between the surface 13a and the surface 15a, the mutual slippage in the circumferential direction between the second flange 13 and the second side ring 15 will be prevented more effectively.

Eighth, in the case where the circumferentially extending surface 13b of the second flange 13 and the tapered surface $15b_1$ of the circumferentially extending inner surface 15b of the second side ring 15 are inclined by about 10 to about 35 degrees with respect to the axial direction of the multi-piece rim, the mutual slippage in the circumferential direction is prevented more effectively, so that generation of cracks due to fretting is prevented more effectively.

The foregoing description of the embodiments of the present invention provides illustration and description, but is not intended to be exhaustive or to limit the invention to the precise form disclosed. Modifications and variations are possible that are consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A multi-piece rim comprising:
   a rim base including a first flange and a gutter band;
   a bead seat band including a second flange;
   a lock ring; and
   a first side ring located on a side of said first flange and a second side ring located on a side of said second flange, said first side ring including a radially extending, axially outboard side surface, and a circumferentially extending inner surface, which includes a tapered surface and a non-tapered surface located axially inboard of said tapered surface,
   wherein said first flange of said rim base includes a radially extending, axially inboard surface axially opposing said radially extending side surface of said first side ring and a circumferentially extending surface radially contacting said tapered surface of said circumferentially extending inner surface of said first side ring,
   wherein said circumferentially extending surface of said first flange and said tapered surface of said circumferentially extending inner surface of said first side ring are inclined radially outwardly in an axially outboard direction of said multi-piece rim,
   wherein said radially extending surface of said first flange and said radially extending side surface of said first side ring contact each other.

2. A multi-piece rim according to claim 1, wherein said circumferentially extending surface of said first flange and said tapered surface of said circumferentially extending inner surface of said first side ring are inclined by about 10 to about 35 degrees with respect to an axial direction of said multi-piece rim.

3. A multi-piece rim comprising:
   a rim base including a first flange and a gutter band;
   a bead seat band including a second flange;
   a lock ring; and
   a first side ring located on a side of said first flange and a second side ring located on a side of said second flange, said first side ring including a radially extending, axially outboard side surface, and a circumferentially extending inner surface, which includes a tapered surface and a non-tapered surface located axially inboard of said tapered surface,
   wherein said first flange of said rim base includes a radially extending, axially inboard surface axially opposing said radially extending side surface of said first side ring and a circumferentially extending surface radially contacting said tapered surface of said circumferentially extending inner surface of said first side ring,
   wherein said circumferentially extending surface of said first flange and said tapered surface of said circumferentially extending inner surface of said first side ring are inclined radially outwardly in an axially outboard direction of said mufti-piece rim, wherein said second side ring includes a radially extending, axially outboard side surface, and a circumferentially extending inner surface which includes a tapered surface and a non-tapered surface located axially inboard of said tapered surface, and said second flange of said bead seat band includes a radially extending, axially inboard surface axially opposing said radially extending side surface of said second side ring, and a circumferentially extending surface radially contacting said tapered surface of said circumferentially extending inner surface of said second side ring,
   wherein said radially extending surface of said second flange and said radially extending side surface of said second side ring contact each other.

4. A multi-piece rim according to claim 3, wherein said circumferentially extending surface of said second flange and said tapered surface of said circumferentially extending inner surface of said second side ring are inclined radially outwardly in an axially outboard direction of said multi-piece rim.

5. A multi-piece rim according to claim 4, wherein said circumferentially extending surface of said second flange and said tapered surface of said circumferentially extending inner surface of said second side ring are inclined by about 10 to about 35 degrees with respect to an axial direction of said multi-piece rim.

* * * * *